United States Patent Office 3,452,032
Patented June 24, 1969

3,452,032
METHOD FOR THE PRODUCTION OF CERTAIN AROMATIC AND HETERO-AROMATIC ALDEHYDES
Robert K. Grasselli, Garfield Heights, Ohio, assignor to The Standard Oil Company, Cleveland, Ohio, a corporation of Ohio
No Drawing. Continuation-in-part of application Ser. No. 450,537, Apr. 23, 1965. This application Mar. 16, 1967, Ser. No. 623,563
Int. Cl. C07d 31/32; B01j 11/32
U.S. Cl. 260—297
9 Claims

ABSTRACT OF THE DISCLOSURE

The instant invention relates to a direct-catalytic process for making monoolefinically unsaturated aromatic aldehydes from allyl substituted aromatic compounds.

---

This application is a continuation-in-part application of copending application Ser. No. 450,537, filed Apr. 23, 1965, now Patent No. 3,325,504 granted June 13, 1967.

The present invention relates to a process for the manufacture of monoolefinically unsaturated aromatic nitriles and aldehydes from certain substituted allyl aromatic compounds. More particularly, it relates to a direct process for converting compounds having the structure

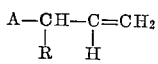

wherein A is an aromatic radical such as phenyl, naphthyl, pyridyl, quinolyl, anthryl or phenanthryl and R is either hydrogen or a hydrocarbon group having from 1 to 10 carbon atoms, to monoolefinically unsaturated aldehydes by catalytic reaction with molecular oxygen or to monoolefinically unsaturated nitriles by catalytic reaction with molecular oxygen and ammonia. For example, allyl benzene may be converted to cinnamaldehyde or to cinnamonitrile with high yields.

In the past, processes for the preparation of cinnamaldehyde or cinnamonitrile have generally involved several steps and usually produced relatively low yields of rather impure products. More recently a direct, one-step catalytic process has been discovered wherein β-methyl styrene is converted to cinnamaldehyde or cinnamonitrile and this process is more fully described and claimed in the copending U.S. patent application of R. K. Grasselli and J. L. Callahan, Ser. No. 423,818, filed Jan. 6, 1965. The reaction in this recently discovered process is comparatively straightforward and the yields are fair. Surprisingly, the reaction of the instant process starting with the substituted allyl aromatic compound, though it apparently involves an electronic rearrangement, gives exceptionally good yields.

It is a object of this invention to poduce directly from an allyl aromatic compound such as allyl benzene the aldehyde and nitrile compounds such as cinnamaldehyde and cinnamonitrile. This may be accomplished, for example, by reacting allyl benzene with a reactant such as (1) oxygen and (2) oxygen and ammonia, in the presence of any one of several oxidation catalysts, and preferably a catalyst comprising antimony oxide as an essential ingredient in combination with at least one other polyvalent metal oxide, hereinafter more fully disclosed.

Several catalysts have been found to be operative in the process of this invention. In general, the oxides of one or more polyvalent metal elements are useful as catalysts in the process of this invention. More particularly, the useful catalysts for this process are those composed of at least one oxide of an element appearing in Groups I–B, II–B, IV–A, V, VI–B, VII–B, and VIII of the Mendelyeev Periodic Table (see Handbook of Chemistry and Physics, 38th ed., Chemical Rubber Publishing Co., Cleveland, Ohio, pp. 394–395). Operative catalysts include the combined oxides of antimony and at least one other polyvalent metal such as the combined oxides of antimony and uranium, the combined oxides of antimony and iron, the combined oxides of antimony and manganese, the combined oxides of antimony and thorium, the combined oxides of antimony and cerium and the combined oxides of antimony and tin and mixtures of one or more of the foregoing combinations of oxides.

Other catalysts useful in this invention are composed of at least one salt of molybdic, phosphomolybdic, tungstic, and phosphotungstic acids with an element appearing in Groups I–B, II–B, IV–A, V, VI–B, VII–B and VIII of the Mendelyeev Periodic Table. Operative catalysts include bismuth molybdate, bismuth phosphomolybdate, antimony-bismuth molybdate, antimony-bismuth phosphomolybdate, bismuth phosphotungstate, bismuth silicomolybdate, bismuth silicophosphomolybdate, bismuth silicotungstate, bismuth silicophosphotungstate and mixtures of one or more of the foregoing combinations of salts.

Promoter metal oxides incorporated in the catalyst so as to comprise up to 15% by weight thereof, based on the weights of the elemental metals, may be used effectively, but amounts up to 5% by weight of one or more promoter oxides are preferred.

The catalyst useful in the present invention may be used alone or supported on or impregnated in a carrier material. Any suitable carrier material may be used, including silica, alumina, thoria, zirconia, titania, boron phosphate, silicon carbide, pumice, diatomaceous earth, clay and the like. In general, the support will be employed in amounts less than 95% by weight of the final catalyst composition.

The catalysts useful in the present invention may be prepared in numerous ways known in the art. For instance, the catalysts may be manufactured by co-gelling the various ingredients and drying or by spray-drying, extruding or spherulizing in oil.

The catalyst may be calcined to produce desirable physical properties such as attrition resistance, surface area and particle size. It is preferred that the calcined catalyst be further heat-treated in the presence of oxygen at an elevated temperature above 500° F. but below a temperature deleterious to the catalyst. For the purpose of the present invention, a catalyst having a particle size between 1 and 500 microns and a surface area in the range from 1 to 25 square meters per gram is preferred.

In the process for the manufacture of monoolefinically unsaturated aromatic nitriles and aldehydes embodied herein, the temperature may be any temperature in the range from 200 to 800° C., the preferred range being 350 to 500° C.

The pressure at which the instant reaction is conducted is an important variable; a preferred pressure for conducting the reaction is from about 1 to 3 atmospheres so that the yield of undesirable by-products is minimized.

The apparent contact time employed in the process of this invention should be kept within certain limits to obtain good selectivity and yields. The apparent contact time may be defined as the time in seconds a unit volume of gas, measured at reactor conditions of temperature and pressure, is in contact with the apparent unit volume of catalyst. It may be calculated, for instance, from the apparent volume of the catalyst bed, the average temperature and pressure of the reactor and the mass flow rate of the reaction mixture. The optimum contact time will depend upon the particular alkyl substituted aromatic hydrocarbons being oxidized or ammoxidized. A contact time from 0.01 to 50 seconds may be used, though a contact time of 0.1 to 5 seconds is preferred.

Molar ratios of air to the vinyl substituted aromatic hydrocarbon may vary from approximately 1:5 to 1:200. Ratios near the high limit make for poor selectivity, while ratios near the low limit decrease catalyst activity. Preferred molar ratios of air to hydrocarbon are in the range of 1:10 to 1:100.

No ammonia is present in the feed when the vinyl substituted aromatic is to be oxidized to the corresponding aldehyde, but only when the ammoxidation reaction producing the nitrile is to be conducted. In this latter case, up to 20 moles of ammonia per mole of hydrocarbon are found to be effective. For economic reasons, approximately stoichiometric quantities of hydrocarbon feed and ammonia are preferred.

Any molecular oxygen containing gas can be used in this process. Oxygen itself may be used without any diluent, although it is usually desirable to use in addition to oxygen at least one diluent such as steam, carbon dioxide, nitrogen and the inert gases. Any molar ratio of diluent within the range of 1:1 to 1:100 may be used, but the range from 1:50 to 1:75 gives satisfactory control of the reaction in either a fixed bed or fluidized bed reactor.

The equipment required for the reaction may be the standard type used for carrying out vapor phase oxidation reactions, such equipment being well-known to those skilled in the art. For the experimental work in the present invention, a tubular fixed bed reactor, equipped with an injection system was immersed in a molten salt bath. The gaseous reactants and diluents were introduced from pressurized containers fitted with pressure regulators, and the amount introduced was measured by flow meters.

The reactants are introduced into the reactor either at reaction temperature by first passing them through a preheater zone or by introducing them directly into the reactor and allowing them to come to reaction temperature as they travel through the catalyst bed.

The reaction products can be recovered by any desirable. One method is the use of solvent scrubbers. A preferred method is the use of one or more Dry Ice traps in series which serve to isolate the reaction products by condensing them. The products of reaction were analyzed using standard techniques including gas chromatography, infrared analysis and nuclear magnetic resonance.

While only the preferred form of the invention is described in detail, it will be apparent to those skilled in the art that various modifications may be made therein without departing from the scope of the invention or the scope of the appended claims.

In the examples the following definitions are employed:

Percent conversion-carbon basis =
$$\frac{\text{Weight of carbon in the products of reaction}}{\text{Weight of carbon in the propylene feed}} \times 100$$

The combined oxides of the polyvalent metals are referred to as the active phase of the catalyst and the silica carrier is referred to as the inactive phase. The weight percent of promoter metals referred to in the following examples corresponds to the ratio of the actual weight of the elemental metal present in the oxide or salt mixed into the unpromoted catalyst to the total weight of active phase, including the promoter metal oxide.

EXAMPLES 1–12

Several runs made with different catalysts using allyl benzene for feed are set forth in Table I below. For purposes of comparison, the same catalysts were used with β-methyl styrene for feed at substantially the same reaction conditions as in the previous runs.

The preparation of one of the catalysts will be outlined below:

Catalyst: $70(70Sb/30\ U) - 30(SiO_2)$ 322.8 gm. of $Sb_2O_3$ (White Star Grade M) and 136.2 gm. of $U_3O_8$ Grade 1 were mixed with 800 cc. of concentrated nitric acid and heated for 45 minutes until fuming ceased. To this was added some water to cool the slurry, and 655.7 gm. of a 30% by weight colloidal suspension of silica in water and sufficient ammonium hydroxide to obtain a pH of 8. The catalyst was filtered and washed with water, dried overnight at 120° C., calcined for 24 hours at 800° F. and heat-treated for 8 hours at 1,725° F.

672 gm. were mixed with 373.3 gm. of a 30% by weight colloidal suspension of silica in water, in a high speed blender, and the mixture was extruded onto aluminum foil. This material was dried overnight at 120° C. and heat-treated for 6 hours at 1,725 °F.

EXAMPLES 13–15

Runs made with an antimony oxide-uranium oxide catalyst, set forth in Table II below, show conversions for the oxidation of allylbenzene to cinnamaldehyde at different temperatures, and for comparison, the conversion of β-methylstyrene to cinnamaldehyde at 460° C.

TABLE I

| Expt. No. | Feed | Catalyst | Temp., °C. | Mole Ratio | | | | Per Pass Conversion to | | | |
|---|---|---|---|---|---|---|---|---|---|---|---|
| | | | | Feed | NH$_3$ | Air | N$_2$ | Cinnamonitrile | Benzonitrile | Atroponitrile | Quinoline |
| 1 | Allylbenzene | 60(70Sb/30U)40(SiO$_2$) | 460 | 1 | 1.5 | 50 | 72.5 | 57.8 | 4.6 | 0.8 | 1.8 |
| 2 | β-Methylstyrene | 60(70Sb/30U)40(SiO$_2$) | 460 | 1 | 1.5 | 50 | 72.5 | 18.6 | 17.7 | | 3.7 |
| 3 | Allylbenzene | 60(70Sb/30U)40(SiO$_2$) | 410 | 1 | 1.5 | 50 | 72.5 | 46.7 | 3.2 | 1.0 | 2.4 |
| 4 | β-Methylstyrene | 75(95Sb/5Fe)25(SiO$_2$) | 460 | 1 | 1.5 | 50 | 72.5 | 5.1 | 14.4 | | 1.8 |
| 5 | Allylbenzene | 75(95Sb/5Fe)25(SiO$_2$) | 410 | 1 | 1.5 | 50 | 72.5 | 18.8 | 8.3 | 1.6 | 1.3 |
| 6 | do | 50(Bi$_9$PMo$_{12}$O$_{52}$)50(SiO$_2$) | 410 | 1 | 1.5 | 59 | 72.5 | 5.1 | 4.6 | 0.9 | 0.7 |
| 7 | do | 44(Sb$_{6.1}$Bi$_{5.1}$PMo$_{12}$O$_{55.2}$)+56(SiO$_2$) | 460 | 1 | 3.0 | 48.5 | 72.5 | 6.7 | 9.6 | 16.3 | |
| 8 | do | 44(Sb$_{6.1}$Bi$_{5.1}$PMo$_{12}$O$_{55.2}$)+56(SiO$_2$) | 410 | 1 | 3.0 | 48.5 | 72.5 | 12.6 | 4.6 | 1.6 | |
| 9 | do | 44(Sb$_{6.1}$Bi$_{5.1}$PMo$_{12}$O$_{55.2}$)+56(SiO$_2$) | 410 | 1 | 1.5 | 50 | 72.5 | 11.7 | 3.7 | 0.5 | |
| 10 | do | 62Bi$_2$O$_3$, 38MoO$_3$ | 460 | 1 | 1.5 | 50 | 72.5 | 9.6 | 15.6 | 11.0 | 3.5 |
| 11 | do | 82.5(Ni$_{10.5}$FeBiPMo$_{12}$O$_{57.25}$)+17.5(SiO$_2$) | 360 | 1 | 1.5 | 50 | 72.5 | 14.0 | 5.0 | | |
| 12 | do | 82.5(Ni$_{10.5}$FeSb$_{9.5}$Bi$_{0.5}$Mo$_{12}$O$_{55}$)+17.5(SiO$_2$) | 360 | 1 | 1.5 | 50 | 72.5 | 7.5 | 3.2 | | |

TABLE II

| Expt. No. | Feed | Catalyst | Temp., °C. | Mole Ratio | | | | Per Pass Conversion to | | |
|---|---|---|---|---|---|---|---|---|---|---|
| | | | | Feed | NH$_3$ | Air | N$_2$ | Cinnamaldehyde | Benzaldehyde | Atropaldehyde |
| 13 | Allylbenzene | 60(70Sb/30U)40(SiO$_2$) | 460 | 1 | 0 | 51.5 | 72.5 | 32.8 | 8.3 | |
| 14 | do | 60(70Sb/30U)40(SiO$_2$) | 410 | 1 | 0 | 51.5 | 72.5 | 24.5 | 1.2 | |
| 15 | β-Methylstyrene | 60(70Sb/30U)40(SiO$_2$) | 460 | 1 | 0 | 51.5 | 72.5 | 6.6 | 5.7 | |

I claim:
1. A process for the manufacture of a compound having the structure

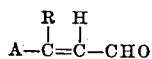

wherein A is an aromatic group selected from the group consisting of phenyl, naphthyl, pyridyl, quinolyl anthryl and phenanthryl radicals and R is selected from the group consisting of hydrogen and a lower alkyl group having from 1 to 4 carbon atoms, comprising reacting a monolefinically substituted aromatic compound having the structure

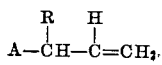

wherein A and R have the same connotation as above, with reactants comprising ammonia and molecular oxygen in the presence of the oxide of at least one metal element selected from the group consisting of antimony, uranium, iron, bismuth, nickel, manganese, thorium, cerium, tin, or in the presence of at least one salt of molybdic, phosphomolybdic, tungstic and phosphotungstic acids with at least one of the said metal elements, supported or unsupported by a catalyst support at about atmospheric pressure at a temperature in the range of 200° to 800° C.

2. The process of claim 1 in which the monoolefinically substituted aromatic compound is allylbenzene.
3. The process of claim 1 in which the monoolefinical substituted aromatic compound is allyl pyridine.
4. The process of claim 1 in which the operating pressure is at about atmospheric pressure.
5. The process of claim 1 in which the molar ratio of allylbenzene to air is in the range from 1:5 to 1:200.
6. The process of claim 1 in which the operating temperatures are in the range of from 350 to 500° C.
7. The process of claim 6 in which the catalyst is fixed bed pelletized catalyst.
8. The process of claim 6 in which the catalyst is fluidized bed spherulized catalyst.
9. The process of claim 8 in which the apparent contact time is in the range of 0.1 to 15 seconds.

References Cited

UNITED STATES PATENTS 3,067,205  12/1962  Callighan et al. _____ 260—29

HENRY R. JILES, *Primary Examiner.*

ALAN L. ROTMAN, *Assistant Examiner.*

U.S. Cl. X.R.

252—437, 455, 456, 459; 260—289, 294.9, 599